C. C. MILLER.
HEATING APPARATUS.
APPLICATION FILED FEB. 18, 1913.
1,114,172.
Patented Oct. 20, 1914.
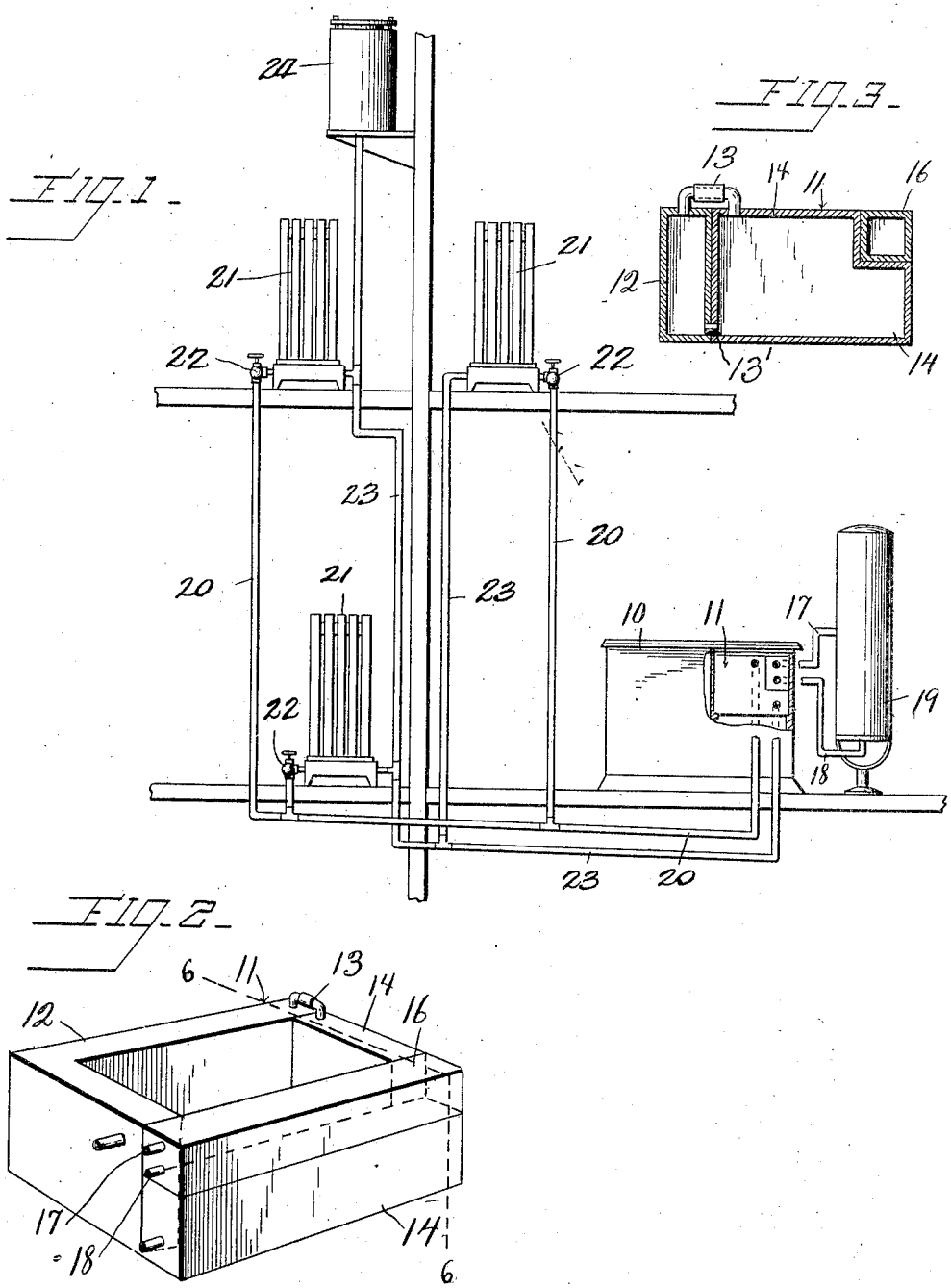

UNITED STATES PATENT OFFICE.

CALVIN C. MILLER, OF SUMMITHILL, PENNSYLVANIA.

HEATING APPARATUS.

1,114,172.  Specification of Letters Patent.  Patented Oct. 20, 1914.

Application filed February 18, 1913. Serial No. 749,173.

*To all whom it may concern:*

Be it known that I, CALVIN C. MILLER, a citizen of the United States, residing at Summithill, in the county of Carbon, State of Pennsylvania, have invented certain new and useful Improvements in Heating Apparatus; and I do hereby declare the following to be a full, clear, and exact description of the invention, such as will enable others skilled in the art to which it appertains to make and use the same.

This invention has special reference to heating apparatus and more particularly to a system designed for use in connection with the usual cook stove of a residence.

The essential object of the invention relates to the provision of a hot water heating system including the usual radiators and fluid conducting pipes for the hot water and connections for said pipes with casings of novel construction contained within the fire box of a cook stove, for heating water to be supplied to the radiators through said pipes said casings also including a section adapted for heating water in an ordinary hot water tank.

With the above and other objects in view, the invention resides more particularly in the peculiar combination and arrangement of parts which will be illustrated in the accompanying drawings, and described in the specification, although the invention is protected for all desirable changes and uses within the scope of the invention as claimed.

Figure 1 is an elevation in diagrammatic form of my improved hot water heating system, with the cooking stove in section to show the casing forming the fire-box thereof, Fig. 2 is an enlarged perspective view of the casing parts in position as they are fitted in the stove, together with the adjacent pipe connections, and Fig. 3 is an enlarged sectional view of the fire-box forming casing in which the water is heated, taken on the line 6—6.

In carrying out my invention, I provide the fire-box of an ordinary cook stove 10 with a casing 11 forming the lining of the box. This casing consists of a series of hollow castings, preferably three in number, namely an angular or L shaped section 12 forming the back and one end of the lining and having communication through pipe connections 13 and 13' with an angular or L-shaped section 14 forming the other end of the lining and the lower portion of the front of the lining, the same being adapted to contain water to be heated by the fire ordinarily used for cooking purposes. The upper front section of the casing is indicated by the numeral 16 and is connected in the usual manner through feed and return pipes 17 and 18 to a hot water tank 19, thereby furnishing hot water for house use. These three casing sections are fitted together so as to form a quadrangular box having hollow walls which are divided into separate compartments and combine to inclose an open fuel receptacle.

My improved hot water system is indicated diagrammatically in Fig. 1 of the drawings and as shown, the casing 11 in the stove is connected directly with the feed or flow pipes 20 leading to the radiators 21 and having valves 22 controlling the supply of hot water to the radiators, while the return pipe 23 is connected with each radiator and an elevated expansion tank 24 into which the water rises as it is heated. The casing section 16 forming the upper portion of the front of the fire box lining is also connected in the usual manner with the hot water tank 19. Thus it will be apparent that I have provided a very economical domestic heating apparatus in conjunction with an ordinary cooking stove whereby considerable saving in fuel is accomplished.

I claim:

1. In a heating apparatus for attachment to a range, a casing consisting of hollow sections adapted to be fitted in the fire-box of the range and to communicate with radiators, one section being of angular formation and forming the back and one end of the casing, another section forming the other end and lower half of the front portion of the casing and communicating with the first-named section, and a third section forming the upper half of the front part of the casing and being adapted for connection with a water tank.

2. In a water heating attachment for a cooking range, two separable L-shaped water compartments and a third water compartment fitted together to form a quadrangular box of which the hollow walls inclose an open fuel receptacle, said L-shaped compartments being in communication with each other by means of pipes, and said third compartment being in non-communicating relation with the L-shaped compartments, and a tank with which said third compartment is in communication.

In testimony whereof, I affix my signature, in the presence of two witnesses.

CALVIN C. MILLER.

Witnesses:
 OLIVER REX,
 ALBERT S. MILLER.